US009644953B2

United States Patent
Perkins et al.

(10) Patent No.: US 9,644,953 B2
(45) Date of Patent: May 9, 2017

(54) METHOD AND APPARATUS FOR ALIGNING COMPONENTS OF INTEGRATED OPTICAL SENSORS

(71) Applicant: Halliburton Energy Services Inc., Houston, TX (US)

(72) Inventors: David L. Perkins, The Woodlands, TX (US); William Soltmann, The Woodlands, TX (US); Jimmy Anders, Montgomery, TX (US); Robert Atkinson, Richmond, TX (US); Wei Zhang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/378,595

(22) PCT Filed: Sep. 11, 2013

(86) PCT No.: PCT/US2013/059136
§ 371 (c)(1),
(2) Date: Aug. 13, 2014

(87) PCT Pub. No.: WO2015/038109
PCT Pub. Date: Mar. 19, 2015

(65) Prior Publication Data
US 2016/0010981 A1    Jan. 14, 2016

(51) Int. Cl.
*G01B 11/26* (2006.01)
*G01B 11/27* (2006.01)
*G01J 3/02* (2006.01)

(52) U.S. Cl.
CPC .......... *G01B 11/272* (2013.01); *G01J 3/0229* (2013.01)

(58) Field of Classification Search
CPC ....... G01B 11/27; G01B 11/26; G01B 11/272; G01C 15/002; F41G 3/323
(Continued)

(56) References Cited

U.S. PATENT DOCUMENTS 3,604,778 A * 9/1971 Burckhardt ............. G06E 3/001
359/29
5,949,541 A 9/1999 Merle
(Continued)

FOREIGN PATENT DOCUMENTS

EP          2320027          5/2011
WO    WO2007064575 A1      6/2007
WO    WO2007078556 A1      7/2007

OTHER PUBLICATIONS

International Search Report and The Written Opinion of the International Searching Authority, or the Declaration, May 8, 2014, PCT/US2013/059136, 11 pages, International Searching Authority, U.S.

*Primary Examiner* — Tarifur Chowdhury
*Assistant Examiner* — Md M Rahman
(74) *Attorney, Agent, or Firm* — Haynes and Boone, LLP

(57) ABSTRACT

A method and apparatus for aligning optical components within an optical sensor. A mask with an elongate slot formed therethrough is placed optically between an optical emitter and an optical detector of the sensor. The mask is rotated 180 degrees while the detector output is measured. As the mask is rotated, the output varies. The longitudinal position of the slot that corresponds with the maximum detector output is indicative of the transverse direction that the optical emitter must be moved relative to the optical detector for optimal alignment. A controller may operate a first actuator for translating the optical emitter with respect (Continued)

to the optical detector and a second actuator for rotating the mask, thereby automating the alignment process.

18 Claims, 2 Drawing Sheets

(58) Field of Classification Search
USPC .......................................................... 356/153
See application file for complete search history.

(56) References Cited

U.S. PATENT DOCUMENTS

| | | | |
|---|---|---|---|
| 2007/0062919 A1 | 3/2007 | Hamada et al. | |
| 2007/0294094 A1* | 12/2007 | Alessandrini | G06Q 30/02 |
| | | | 705/400 |
| 2008/0187305 A1* | 8/2008 | Raskar | G02B 27/0075 |
| | | | 396/268 |
| 2009/0127240 A1* | 5/2009 | Sercel | A61F 9/00817 |
| | | | 219/121.72 |
| 2012/0105586 A1* | 5/2012 | Miesak | G06K 9/00013 |
| | | | 348/46 |

* cited by examiner

METHOD AND APPARATUS FOR ALIGNING COMPONENTS OF INTEGRATED OPTICAL SENSORS

The present application is a U.S. National Stage patent application of International Patent Application No. PCT/US2013/059136, filed on Sep. 11, 2013, the benefit of which is claimed and the disclosure of which is incorporated herein by reference in its entirety.

FIELD

The present disclosure relates generally to optical sensors.

BACKGROUND

When light interacts with matter, for example via transmission or reflection, it carries away information about the physical and chemical properties of the matter with which it interacted. A property of the light, for example its intensity, may be measured and interpreted to provide information about the matter with which it interacted. That is, the data carried by the light through its intensity may be measured to derive information about the matter.

In general, it is difficult to convert a simple measurement of light intensity into information because of interfering data. That is, several factors may contribute to the intensity of light, even in a relatively restricted wavelength range. It is often impossible to adequately measure the data relating to one of these factors, because the contribution of the other factors is unknown.

It is possible, however, to derive information from light. An estimate may be obtained, for example, by separating light from several samples into wavelength bands, performing a multiple linear regression of the intensity of these bands, and comparing these against the results of conventional measurements of the desired information for each sample. Light from each of several samples may be directed to a series of bandpass filters which separate predetermined wavelength bands from the light. Light detectors following the bandpass filters measure the intensity of each light band. Using conventional means, a multiple linear regression of several measured bandpass intensities may produce an equation such as:

$$y = a_0 + a_1 w_1 + a_2 w_2 + \ldots + a_n w_n \quad \text{(Equation 1)}$$

where y is an estimated parameter, $a_n$ is a constant determined by the regression analysis, and $w_n$ is the light intensity for each wavelength band.

Depending on the circumstances, however, the estimate may be unacceptably inaccurate, because other factors may affect the intensity of the wavelength bands. Moreover, these other factors may change from one sample to the next in an inconsistent manner.

A more accurate estimate may be obtained by compressing the data carried by the light into principal components. To obtain the principal components, spectroscopic data is collected for a variety of samples of the same type of light. The light samples are spread into their wavelength spectra by a spectrograph so that the magnitude of each light sample at each wavelength may be measured. This data is then pooled and subjected to a linear-algebraic process known as singular value decomposition (SVD). SVD is at the heart of principal component analysis, which is generally well known by routineers in this art apart from the particular teachings of the present disclosure.

Briefly, principal component analysis is a dimension reduction technique which takes m spectra with n independent variables and constructs a new set of eigenvectors that are linear combinations of the original variables. The eigenvectors may be considered a new set of plotting axes. The primary axis, termed the first principal component, is the vector which describes most of the data variability. Subsequent principal components describe successively less sample variability, until only noise is described by the higher order principal components.

Typically, the principal components are determined as normalized vectors. Thus, each component of a light sample may be expressed as $x_n \hat{z}_n$, where $x_n$ is a scalar multiplier and $\hat{z}_n$ is the normalized component vector for the $n^{th}$ component. That is, $\hat{z}_n$ is a vector in a multi-dimensional space where each wavelength is a dimension. Normalization determines values for a component at each wavelength so that the component maintains its shape and so that the length of the principal component vector is equal to one. Thus, each normalized component vector has a shape and a magnitude so that the components may be used as the basic building blocks of all light samples having those principal components. Accordingly, each light sample may be described in the following format by the combination of the normalized principal components multiplied by the appropriate scalar multipliers:

$$x_1 \hat{z}_1 + x_2 \hat{z}_2 + \ldots + x_n \hat{z}_n \quad \text{(Equation 2)}$$

The scalar multipliers $x_n$ may be considered the "magnitudes" of the principal components in a given light sample when the principal components have a standardized magnitude as provided by normalization.

Because the principal components are orthogonal, they may be used in a relatively straightforward mathematical procedure to decompose a light sample into the component magnitudes which accurately describe the data in the original sample. Since the original light sample may also be considered a vector in the multi-dimensional wavelength space, the dot product of the original signal vector with a principal component vector is the magnitude of the original signal in the direction of the normalized component vector. That is, it is the magnitude of the normalized principal component present in the original signal. This is analogous to breaking a vector in a three dimensional Cartesian space into its X, Y and Z components. The dot product of the three-dimensional vector with each axis vector, assuming each axis vector has a unity magnitude, gives the magnitude of the three dimensional vector in each of the three directions. The dot product of the original signal and some other vector that is not perpendicular to the other three dimensions provides redundant data, since this magnitude is already contributed by two or more of the orthogonal axes.

Because the principal components are orthogonal, or perpendicular, to each other, the dot, or direct, product of any principal component with any other principal component is zero. Physically, this means that the components do not interfere with each other. If data is altered to change the magnitude of one component in the original light signal, the other components remain unchanged. In the analogous Cartesian example, reduction of the X component of the three dimensional vector does not affect the magnitudes of the Y and Z components.

Principal component analysis provides the fewest orthogonal components that can accurately describe the data carried by the light samples. Thus, in a mathematical sense, the principal components are components of the original light that do not interfere with each other and that represent the most compact description of the entire data carried by the light. Physically, each principal component is a light signal that forms a part of the original light signal. Each has a shape over some wavelength range within the original wavelength range. Summing the principal components produces the original signal, provided each component has the proper magnitude.

The principal components comprise a compression of the data carried by the total light signal. In a physical sense, the shape and wavelength range of the principal components describe what data is in the total light signal while the magnitude of each component describes how much of that data is there. If several light samples contain the same types of data, but in differing amounts, then a single set of principal components may be used to exactly describe (except for noise) each light sample by applying appropriate magnitudes to the components.

Thus, the principal components of light may be used to accurately estimate information carried by the light. Accordingly, light that has interacted with a test sample of a known material contaminated with an unknown quantity of a known contaminant can be resolved into its principal components and compared to previously-measured principal components of reference samples with known quantities of contaminants to determine the quantity of contaminant within the test sample.

Most optical sensors include a source of light, or electromagnetic radiation, that interacts with a subject and then shines upon a detector, or radiation transducer. However, despite the mathematical sophistication of today's optical sensors to extract useful information from light, if there is misalignment between the light source and the detector, a portion of the emitted beam may not be optimally measured by the detector, and the sensor output will lose sensitivity and/or accuracy.

As used herein, the term "electromagnetic radiation" refers to radio waves, microwave radiation, infrared and near-infrared radiation, visible light, ultraviolet light, X-ray radiation and gamma ray radiation.

As used herein, the term "detector" may be any device capable of detecting electromagnetic radiation, and may be generally characterized as an optical transducer. For example, the detector may be, but is not limited to, a thermal detector such as a thermopile or photoacoustic detector, a semiconductor detector, a piezo-electric detector, charge coupled device detector, video or array detector, split detector, photon detector (such as a photomultiplier tube), photodiodes, local or distributed optical fibers, and/or combinations thereof, or the like, or other detectors known to those ordinarily skilled in the art. The detector is further configured to produce an output signal, usually in the form of a voltage or current.

Alignment of optical components by machining parts does not account for variation in assembly or in the manufacturing of subassemblies or individual parts. For example, many lamps are known to have a high degree of variation in the filament-to-reflector distance, which creates deviations in proper component alignment.

Accordingly, it is desirable to provide a method and system for quickly and precisely aligning components of optical sensors.

BRIEF DESCRIPTION OF THE DRAWINGS

Embodiments are described in detail hereinafter with reference to the accompanying figures, in which.

DETAILED DESCRIPTION

Figure 1:
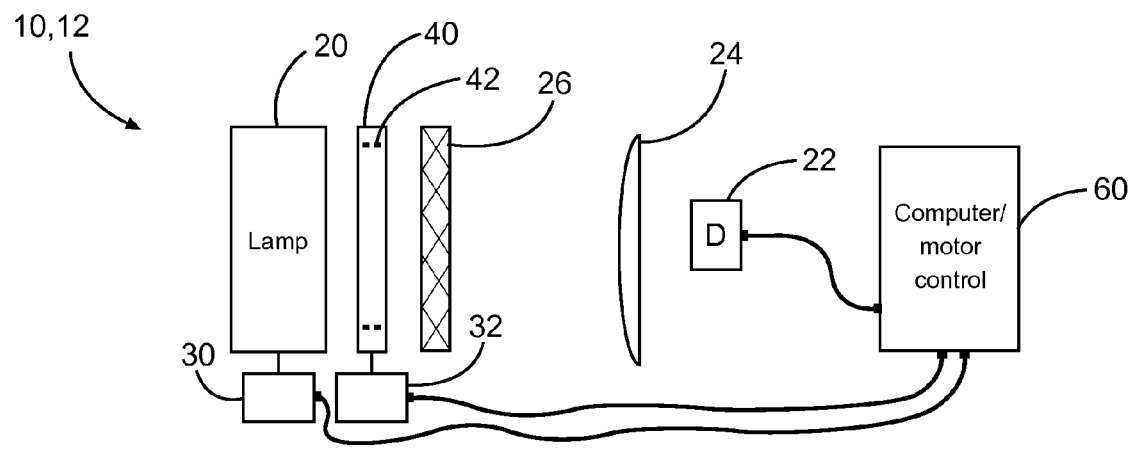
FIG. 1 is a block diagram of an optical detection system according to a preferred embodiment, showing an optical emitter, and optical detector, and a slotted mask positioned therebetween for use in aligning optical components.

FIG. 1 illustrates a system 10 for properly aligning components in an optical sensor 12. Optical sensor 12 includes an optical emitter 20, and an optical detector 22. Optical sensor 12 may also include a lens 24 and a filter 26, as appropriate.

In a preferred embodiment, filter 26 is a multivariate optical element, also known as an Integrated Computing Element ("ICE"). The design and operation of ICE structures are known in the art.

System 10 includes a component actuator 30 that is arranged to translate, preferably in the two lateral (x and y) directions, optical emitter 20 with respect to optical detector 22. Component actuator 30 may be connected to optical emitter 20, optical detector 22, or both. System 10 further includes a mask, 40, which is located in the light path between optical emitter 20 and optical detector 22. Mask 40 has a thin long aperture, or slot, 42 formed therethrough. Mask 40 is ideally located adjacent or near to optical emitter 20. A mask actuator 32 is connected to mask 40 and is arranged to rotate mask 40 about the sensor's longitudinal (z) axis.

Figure 2A:
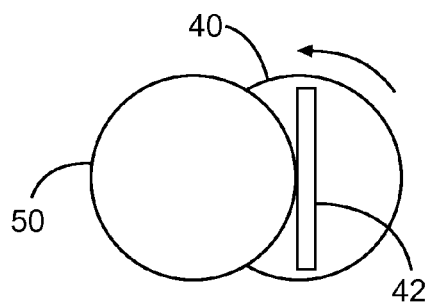
FIG. 2A is an elevation of a transverse cross section of a light beam passing between a misaligned optical emitter and detector, and the slotted mask of FIG. 1.
Figure 2B:
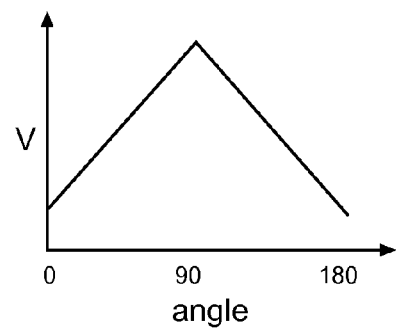
FIG. 2B is a Cartesian graph of the output of an optical detector of the system of FIG. 2A showing how the output varies as the slotted mask is rotated about its axis according to a preferred method.

Referring to FIGS. 1 and 2A, if there is misalignment of two optical components, such as emitter 20 and detector 22, the misalignment may result in a portion of the beam of light 50 missing the detector. This situation is illustrated in FIG. 2A. According to a preferred method, mask 40 is rotated about its axis (the z axis) through 180 degrees using mask actuator 32. As mask 40 is rotated, the amount of light from emitter 20 that passes through aperture 42 in mask 40 and is received by detector 22 varies as shown in FIG. 2B with a maximum output at some mask angle. The mask angle resulting in the maximum output indicates the transverse direction (the x and y directions) that the emitter 20 and detector 22 need to be moved relative to each other.

Figure 3A:
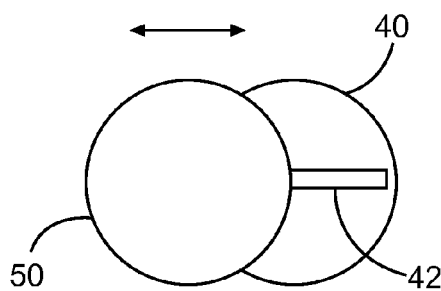
FIG. 3A is an elevation of the system of 2A with the slotted mask angularly oriented to produce a maximum detector output.
Figure 3B:
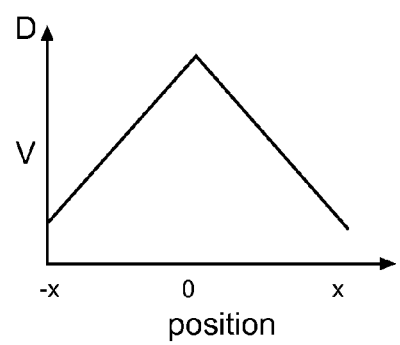
FIG. 3B is a Cartesian graph of the output of an optical detector of the system of FIG. 2C showing how the output varies as the slotted mask is translated according to a preferred method.

Next, as illustrated in FIGS. 1, 3A and 3B, actuator 30 translates optical emitter 20 (with respect to detector 22, or vice versa) in the transverse direction that was previously determined by the mask rotation until the output of detector 22, as shown in FIG. 3B, is maximized, thereby properly aligning the optical components.

Figure 4:
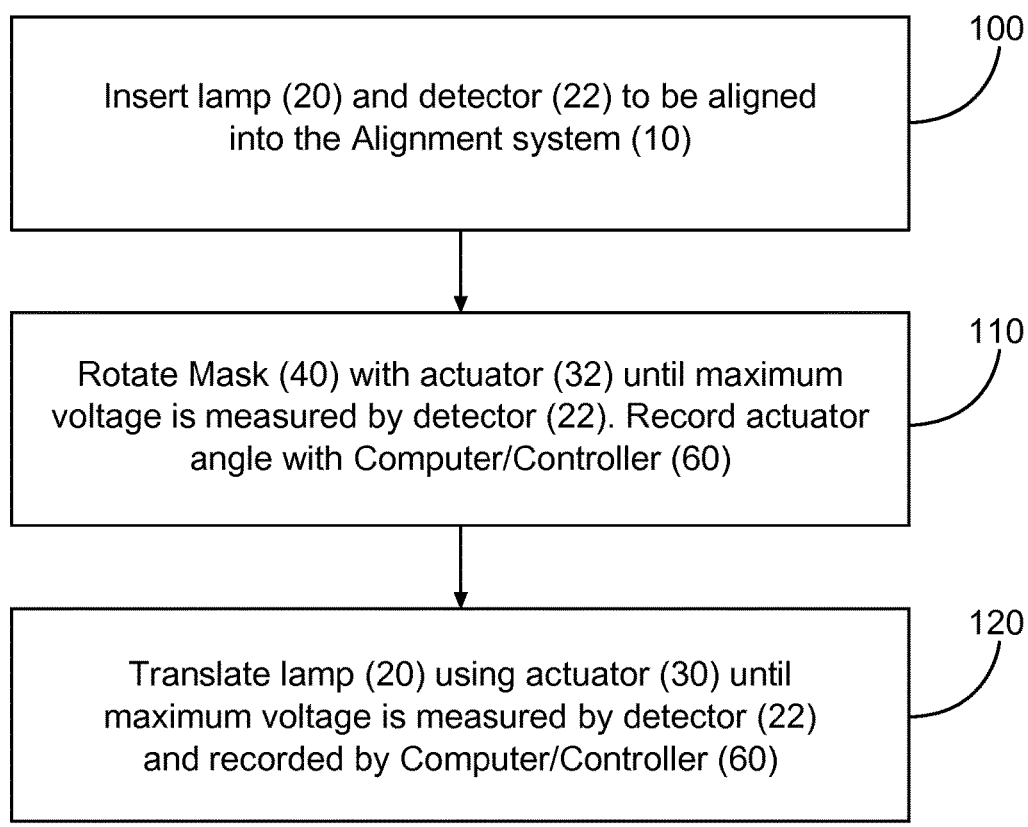
FIG. 4 is a flow chart diagram showing the steps of a method according to a preferred embodiment.

FIG. 4 illustrates a method of aligning optical components according to a preferred embodiment. In step 100, emitter 20 and detector 22 are inserted into the alignment system 10 of FIG. 1. At step 110, mask 40 is rotated by mask actuator 32 until maximum voltage is measured by detector 22. The mask angle is recorded by a computer controller 60. At step 120, emitter 20 is translated using actuator 30 until maximum voltage is measured by detector 22. The position of emitter 20 is recorded by controller 60.

This method and system centers the beam 50 onto the detector 22 for optical detectors in which the spot size of the beam is as large or larger (i.e., overfilling) the detector active area. For optical detectors where the beam spot size is smaller than the active area of the detector, this method and system aligns the beam onto the detector, but does not necessarily center the beam onto the detector.

This method can be performed automatically or manually in two steps. Controller 60 may be connected to receive the output of detector 22 and to control actuators 30 and 32 for automating the process. As computer and motion control systems are well known in the art, further details are not provided herein.

Proper alignment allows for optimal performance of any one optical tool. Proper alignment of optical components also reduces variability from one system to another. Minimizing variation between tools allows for simplified transfers of tools between jobs with the expectation that the tools will operate with the same performance. This system and method may also be used to prequalify lamps, detectors or sub-assemblies. A minimum voltage threshold may be predetermined for each alignment set in the procedure.

The Abstract of the disclosure is solely for providing the United States Patent and Trademark Office and the public at large with a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the scope of the disclosure.

What is claimed:

1. An optical sensor system, comprising:
   an optical detector which detects electromagnetic radiation;
   an optical emitter positioned so as to emit electromagnetic radiation towards said optical detector; and
   a mask defining an axis and having a thin long aperture formed therethrough disposed optically between said optical detector and said optical emitter, said mask arranged for rotation about said axis;
   wherein rotation of said mask about said axis determines an optimal direction of translation of said optical emitter with respect to said optical detector for alignment thereof,
   wherein the optical sensor is thereby aligned to extract information from electromagnetic radiation.

2. The sensor of claim 1 further comprising:
   an actuator coupled to and arranged for positioning at least one of the group consisting of said optical detector and said optical emitter along said optimal direction of translation.

3. The sensor of claim 1 further comprising:
   an actuator coupled to and arranged for rotating said mask about said axis.

4. The sensor of claim 1 further comprising:
   a first actuator coupled to and arranged for positioning at least one of the group consisting of said optical detector and said optical emitter along said optimal direction of translation; and
   a second actuator coupled to and arranged for rotating said mask about said axis.

5. The sensor of claim 4 further comprising:
   a controller coupled to an output of said optical detector and to said first and second actuators and arranged for controlling said first and second actuators based on said output of said optical detector.

6. The sensor of claim 1 further comprising:
   an integrated computing element disposed optically between said emitter and said detector.

7. A system for aligning components of an optical sensor comprising:
   an optical sensor having an optical detector to detect electromagnetic radiation, and an optical emitter positioned so as to emit electromagnetic radiation towards said optical detector; and
   a mask defining an axis and having a thin long aperture formed therethrough, said mask disposed optically between said optical detector and said optical emitter, said mask being arranged for rotation about said axis; wherein
   rotation of said mask about said axis determines an optimal direction of translation of said optical emitter with respect to said optical detector for alignment thereof; and
   the optical sensor is thereby aligned to extract information from electromagnetic radiation.

8. The system of claim 7 further comprising:
   an actuator coupled to and arranged for positioning at least one of the group consisting of said optical detector and said optical emitter along said optimal direction of translation.

9. The system of claim 7 further comprising:
   an actuator coupled to and arranged for rotating said mask about said axis.

10. The system of claim 7 further comprising:
    a first actuator coupled to and arranged for positioning at least one of the group consisting of said optical detector and said optical emitter along said optimal direction of translation; and
    a second actuator coupled to and arranged for rotating said mask about said axis.

11. The system of claim 10 further comprising:
    a controller coupled to an output of said optical detector and to said first and second actuators and arranged for controlling said first and second actuators based on said output of said optical detector.

12. The system of claim 7 further comprising:
    an integrated computing element disposed optically between said emitter and said detector.

13. A method for aligning components of an optical sensor, said optical sensor having an optical detector to detect electromagnetic radiation and an optical emitter positioned so as to emit electromagnetic radiation towards said optical detector, the method comprising:
    disposing a mask having a thin long aperture formed therethrough optically between said optical detector and said optical emitter, said mask defining an axis;
    rotating said mask about said axis;
    measuring an output of said optical detector while rotating said mask; and
    determining an optimal direction of translation of said optical emitter with respect to said optical detector for alignment thereof from the longitudinal direction of said aperture corresponding to a maximum of said output, wherein the optical sensor is thereby aligned to extract information from electromagnetic radiation.

14. The method of claim 13 further comprising:
translating said at least one of the group consisting of said optical detector and said optical emitter in said optimal direction of translation.

15. The method of claim 14 further comprising:
providing an actuator coupled to and arranged for positioning at least one of the group consisting of said optical detector and said optical emitter; and
translating by said actuator said at least one of the group consisting of said optical detector and said optical emitter in said optimal direction of translation.

16. The method of claim 15 further comprising:
providing a controller coupled to said output and said actuator; and
controlling said actuator by said controller.

17. The method of claim 13 further comprising:
providing an actuator coupled to and arranged for rotating said mask about said axis; and
rotating said mask by said actuator.

18. The method of claim 17 further comprising:
providing a controller coupled to said output and said actuator; and
controlling said actuator by said controller.

* * * * *